United States Patent Office 3,843,403
Patented Oct. 22, 1974

3,843,403

METHODS OF MANUFACTURING FERROMAGNETIC CARBON MODIFIED CHROMIUM OXIDE AND COMPOSITIONS AND RECORDING MEDIA CONTAINING SAME

Robert S. Haines, Boulder, Colo., assignor to International Business Machines Corporation, Armonk, N.Y.

No Drawing. Filed Dec. 27, 1971, Ser. No. 212,627
The portion of the term of the patent subsequent to Aug. 17, 1988, has been disclaimed
Int. Cl. C01g 37/02
U.S. Cl. 117—235 19 Claims

ABSTRACT OF THE DISCLOSURE

This invention relates to the methods of forming ferromagnetic chromium oxide compositions containing about 58.5% to 62%, by weight, of chromium; 0.05% to 0.90%, by weight, of carbon; 0% to 1.6%, by weight, of iron and 0% to 0.35%, by weight, of tin; in the form of finely divided particles of tetragonal crystalline structure. The process of forming carbon modified ferromagnetic chromium oxide consists of mixing a chromium salt with a form of elemental carbon, associating the mixture with chromium trioxide, and then subjecting the mixture to heat and pressure decomposition. Where desired, sources of iron and tin are added to the reaction mixture prior to the step of heat and pressure decomposition.

BACKGROUND OF THE INVENTION

Field of the Invention

This invention relates to magnetic compositions and to novel methods for preparing them in finely divided particle form. More particularly, it relates to ferromagnetic compositions of carbon modified chromium oxide having tetragonal crystalline structures and which may contain, in addition, iron and tin, and to methods for their preparation in finely divided particle form. Such particles are suitable for use, for example, in magnetic recording media, magnetic cores, and the like.

Description of the Prior Art

In the prior art, various types of magnetic compositions have been prepared. Included in the prior art magnetic compositions are chromium oxides having ferromagnetic properties. These magnetic chromium oxides have been nominally designated as chromium dioxide and have long been reported in the chemical literature. Early methods of preparation of ferromagnetic chromium oxide have been by heating chromium trioxide in oxygen and by pyrolysis of chromyl chloride. More recently, methods of producing ferromagnetic chromium oxide, primarily from chromium trioxide under conditions of both heat and pressure, and in the presence of water, have been reported. Within the last two decades, heightened interest and activity in the preparation of ferromagnetic chromium oxide has resulted in a substantial number of publications being made and patents being issued in this technology. In some instances, the utilization of preferential substrates during the formation of chromium dioxide, for example, by pyrolysis of chromyl chloride has been reported. In other instances, one or more specific modifying ingredients or oxidizing agents have been included in the reaction mixture during heat and pressure treatment to yield a ferromagnetic chromium oxide which may or may not be modified with an additive ingredient. Included in these prior art modifying ingredients have been both iron and tin. In yet another form of activity, multi-step processes of treating various chromium compounds, with or without modifying ingredients or oxidizing agents, have been utilized to produce forms of ferromagnetic chromium oxide. Recently, techniques of preparing magnetic compositions of carbon modified chromium oxide have been reported in U.S. Pats. 3,600,314 and 3,600,315, both assigned to the assignee of the present patent application.

It is both useful and desirable to provide alternative methods of preparing magnetic chromium oxides, including carbon, iron and tin modified chromium oxides, for use, for example, in the manufacture of magnetic recording media.

SUMMARY OF THE INVENTION

The present invention provides ferromagnetic compositions of finely divided carbon modified chromium oxide, carbon and iron modified chromium oxide and carbon and iron modified chromium oxide and carbon and tin modified chromium oxide by intimately mixing a source of elemental carbon with a chromium salt, associating the mixture with a source of tin or iron, as desired, and then with chromium trioxide. The mixture is then heated at a temperature between about 450° F. and 850° F. while subjecting the reaction mixture to superatmospheric pressure. The initial elemental carbon-chromium salt mixture may be equivalent to about 0.1 to about 40%, by weight, of the chromium trioxide, although greater amounts may be used advantageously. Reaction pressures ranging from 730 to 44,000 p.s.i. are operable. Pressures of about 730 to 14,600 p.s.i. are preferred.

The source of elemental carbon utilized in the present invention may be natural or manufactured, pure or contaminated, solid or particulate, although grinding of the material prior to mixing or reaction increases the efficiency of the procedure. Included within this family of elemental carbons, but not limited thereto, are, for example, acetylene black, bone black, carbon black, charcoal, graphite, and lamp black. Also included within this definition, for convenience, although its exact composition is unknown, is carbon oxide, as defined hereinafter.

The modifying chromium salts operable in the present invention for modification of the elemental carbon generally include any chromium compound capable of being absorbed or adsorbed by the carbon, but do not include the oxides or hydroxides of chromium without additional elements. Especially attractive are the chromium halides, nitrates, sulfate and acetates. Any solvent may be used during the modification procedure. Where the chromium compound is in a liquid or gaseous form, no solvent may be required.

Intimate mixture and treatment of the chromium salt-carbon mixture, once it is formed, may be obtained, if desired, prior to the addition of chromium trioxide in any suitable manner, such as by grinding or ball milling. Where metal balls or pellets containing iron or tin are used during grinding or milling, they may provide sources of these modifying metals to the reaction mixture. Salts and oxides of iron and tin can also be used to add these modifying ingredients to the reaction mixture. The combined reaction mixture, with or without added iron or tin source material, is then placed in a vessel in which it is both heated and subjected to superatmospheric pressure.

Carbon modified magnetic chromium oxide produced by the process of this invention, contains, by weight, about 58.5–62% chromium and about 0.05 to about 0.90% carbon and is in the form of finely divided particles of uniform size. Where iron is present, it represents about 0.15% to about 1.6%, by weight, while tin may be present in about 0.01% to about 0.35%, by weight. The particles display a rutile tetragonal crystalline structure, and are acicular, having a length-to-width ratio of as much as 20 to 1 and an actual length in the range of about 0.1 to 5 microns. The particles containing either carbon and added iron or carbon and added tin as modifying agents display exceptional magnetic properties.

As an added feature of this invention, modifying agents other than carbon, iron and tin may be used in the process of this invention. Other modifying agents, when employed, are used in amounts which are well defined in the prior art.

The foregoing and other objects, features, and advantages of the invention will be apparent from the following more particular description of the preferred embodiments of the invention.

DESCRIPTION OF THE PREFERRED EMBODIMENTS

In the following examples, the reactants were reagent grade chemicals; however, use of commercial grade chemicals is within the scope of this invention. Ferromagnetic particles produced by the method of the present invention were normally separated from the small amounts of unreacted and nonmagnetic constituents by washing, and then dried. Powder samples of the magnetic compositions produced by the present invention were measured with a vibrating sample magnetometer, VSM, at 4,000 oersteds to determine their magnetic properties. Determination of the chemical content of the magnetic particles was obtained using X-ray fluorescense spectroscopy, atomic absorption spectrophotometry, and a Leco Carbon Analyzer. The chromium content was found to range from about 58.5% to 62%, by weight, with the carbon in the range of about 0.05 to 0.90%, by weight, and the balance oxygen. Where added iron was present, it represented about 0.15% to about 1.6%, by weight. When tin was added it was found to be present in about 0.01% to about 0.35%, by weight. Crystal structure was determined by examination of X-ray diffraction patterns. Particle shape, size, and length-to-width ratios were determined from electron micrographs of the particles.

Example I

A portion of chromic chloride, $CrCl_3 \cdot 6H_2O$, weighing 10 grams, was dissolved in 300 ml. of methanol. To this solution was added 20 grams of acetylene black. The mixture was stirred thoroughly, evaporated under ambient conditions, and then subjected to complete drying at 200° C. for one hour. The resulting material was a dry, black, nonmagnetic powder. One gram of this chromium modified carbon material was then mixed with 20 grams of chromium trioxide $CrO_3$ in 50 ml. of water, and then boiled down to a thick paste. The nonmagnetic paste was then placed in a glass tube, the tube stopped with glass wool and placed in an autoclave. The autoclave was pressurized with 3,000 p.s.i. of air and heated over a period of about 20 minutes to a temperature of 700° F. It was held at this temperature for one hour, at the end of which time the pressure within the autoclave was 7,500 p.s.i. After the vessel was cooled, depressurized, and the tube removed from within, it was found to contain a black magnetic powder, which upon X-ray analysis was found to be carbon modified chromium dioxide. The chromium dioxide was tested for magnetic properties by packing a portion in a glass cylinder for measurement by the VSM. The saturation magnetization per gram, or sigma value, was found to be 88 e.m.u./g., and the intrinsic coercivity of the material was found to be 202 oersteds. The particles were highly acicular and on the order of a micron in size. It was noted that even though reagent grade chemicals were used in this process and iron and steel tools avoided, iron was present in the final compound at a rate of 0.02%, by weight.

Example II

In an experiment similar to Example I, chromium dioxide modified with both carbon and added iron was prepared. In this procedure, 20 g. of $CrCl_3 \cdot 6H_2O$ were dissolved in 300 ml. of anhydrous methanol. To this solution was added 10 g. of acetylene black with thorough stirring. The mixture was evaporated to dryness at a temperature of 200° C. in air. A 1 g. portion of the resulting nonmagnetic chromium modified carbon was then placed in a ball mill with 22 g. of carbon steel balls and 15 ml. of water and milled for about 36 hours. The milled modified carbon was then mixed with 20 g. of $CrO_3$, and dried to a thick paste with heat. The nonmagnetic paste was then placed in a glass tube, stopped with glass wool, and placed in an autoclave. The vessel was initially pressurized with air to 3,050 p.s.i. and then heated to 720° F. for a period of one hour. During the heating cycle, the pressure in the vessel was brought up to 7,900 p.s.i. After the vessel was cooled, depressurized, and the tube removed from within, it was found to contain a black magnetic powder which was determined by analysis to be chromium dioxide modified with 0.29% carbon and 1.58% iron, by weight. The modified chromium dioxide was tested for magnetic properties and found to have a sigma value of 87.3 e.m.u./g. and an intrinsic coercivity of 493.3 oersteds. The source of iron in the particles was the carbon steel balls used during milling.

Examples III–IX

Other samples of ferromagnetic carbon and iron modified chromium dioxide were prepared in a similar process. In some examples, $CrF_3 \cdot 3\frac{1}{2}H_2O$, chromium acetate and $CrO_2Cl_2$ were utilized as the modifying chromium salt. In some examples, water rather than methanol was used as the initial solvent. In every instance, chromium modified carbon was ball milled with carbon steel balls for from several hours to as much as 36 hours prior to being reacted with $CrO_3$. Final autoclave pressures of from 6,000 p.s.i. to 8,000 p.s.i. were obtained at temperatures in the range of about 600° F. to 720° F. The resulting carbon and iron modified chrome dioxides exhibited sigma values in the range of about 80 to 90 e.m.u./g. and intrinsic coercivities in the range of about 350 to 600 oersteds.

Example X

In one form of the present invention, high coercivity acicular extremely small ferromagnetic chromium dioxides modified with both carbon and tin can be prepared. Following a procedure similar to Example I, chromium modified carbon was prepared and 1 g. portion milled with tin pellets in water by roll milling for about 20 minutes. This chromium modified tin milled carbon was then mixed with 20 g. of $CrO_3$, dried, and placed in an autoclave. The vessel was pressurized to 3,000 p.s.i. with air, and was heated to 700° F. The final pressure within the vessel was 7,700 p.s.i. The resulting carbon and tin modified ferromagnetic chromium oxide powder was found to have a sigma value of 82.4 e.m.u./g. and an intrinsic coercivity of 381 oersteds. The particles had lengths of from 0.3 to 0.7 micron and widths of from 0.01 to 0.03 micron and contained 0.22%, by weight, of tin, and 0.4%, by weight, carbon. Iron contamination was noted to be about 0.01%, by weight.

Examples XI–XIV

The procedure of Example X was repeated several times substituting carbon black for acetylene black in some instances. Roll milling of the chromium modified carbon with tin pellets was carried on in each example for from 10 minutes to about 1 hour. Final pressures reached in the autoclave ranged from about 6,000 p.s.i. to about 8,000 p.s.i. The ferromagnetic carbon and tin modified chromium oxide obtained exhibited coercivities in the range of about 300 to 450 oersteds and sigma values in the range of about 70 to 90 e.m.u./g. The tin content ranged from about 0.05% to about 0.33%, by weight, while the carbon content ranged from about 0.1% to about 0.7%, by weight. In each instance, the particles were found to be extremely small, under 1 micron average, and exhibited aspect ratios of up to 20 to 1.

In an effort to determine whether the salts of iron and tin could be utilized in the practice of the present invention, various experiments utilizing both the inorganic and organic salts of iron and tin, as well as their oxides, were carried out. In each instance, a ferromagnetic carbon modified chromium oxide containing added tin or iron was found to be formed. While the magnetic properties of these materials were not as high as those of the particles obtained utilizing metal sources, the particles generally exhibited coercivities of about 200 oersteds and sigma values in the range of about 60 to 110 e.m.u./g.

In a series of experiments, a related process has been carried out. In this process, elemental carbon or forms of carbon oxide are modified with metal oxides, metal salts, or by the addition of metal in a metallic form. This modified material is then reacted with chromium trioxide under conditions of heat and pressure to form ferromagnetic carbon and metal modified chromium oxides. As used in this discussion, "carbon oxides" refer to those compounds designated, for example, as "acetylene black oxide" and "graphite oxide." See Hummers and Offeman, *Ann. Chem. 691*, 1–8 (1966). For example, using acetylene black oxide ball milled with steel balls and added to 18 g. of $CrO_3$ a carbon and iron modified chromium oxide having a coercivity of 411 oersteds and a sigma value of 76 e.m.u./g. was formed.

While water or methanol is a convenient solvent for the initial step of mixing the chromium salt and elemental carbon components of the process of the present invention, other solvents can be used for the same purpose. Similarly, grinding at various stages may be by simple mortar and pestle, or by milling with water or other liquids in order to obtain the desired consistency in the reactants. As has already been noted, when metal is used during milling or grinding, the metal tends to be present in the reaction product.

The thermal pressure reaction process may be carried out using either completely dry ingredients or in the presence of water or hydrated constituents. While the presence of small amounts of water during the reaction is preferred, it is not essential. The use of modifying ingredients is within the scope of this invention.

Uses for the materials produced in the foregoing examples are well known. For example, the ferromagnetic compositions produced by the examples may be mixed with nonmagnetic, organic, film-forming binders and utilized to prepare magnetic recording media.

Typical, but not limiting, binders for use singularly or in combination for preparing various recording media, including ferromagnetic particles produced in accordance with this invention, are polyesters, cellulose esters and ethers, epoxides, vinyl chloride, vinyl acetate, acrylate and styrene polymers and copolymers, polyurethanes, polyamides, aromatic polycarbonates, and polyphenyl ethers.

A wide variety of solvents may be used for forming a dispersion of the fine ferromagnetic particles, produced in the foregoing examples, with various binders. Organic solvents, such as ethyl, butyl, and amyl acetate, isopropyl alcohol, dioxane, acetone, methylisobutyl ketone, cyclohexanone, and toluene are useful for this purpose. The particle-binder dispersion may be applied to a suitable substrate by roller coating, gravure coating, knife coating, extrusion, or spraying of the mixture onto the backing, or by other known methods.

In preparing recording media, the magnetic particles of this invention usually comprise about 40% to 90%, by weight, of the solids in the film layer applied to the substrate is usually a flexible resin, such as polyester or cellulose acetate material, although other flexible materials as well as rigid base materials are more suitable for some uses.

The specific choice of nonmagnetic substrate binder, solvent or method of application of the magnetic composition to the support will vary with the properties desired and the specific form of the magnetic recording medium being produced.

In preparing magnetic cores and permanent magnets, the products of the examples are mixed with nonmagnetic plastic or filler in an amount of about 33% to 50%, by volume, of the magnetic material; the particles aligned in a magnetic field; and the mixture pressed into a firm magnet structure. Alignment of the particles may be accomplished in an externally applied DC magnetic field of about 4,000 gauss, or more. Pressures may vary widely in forming the magnet. Pressures up to 100,000 p.s.i. and fields of 28,000 gauss have been used commercially.

While the invention has been particularly shown and described with reference to preferred embodiments thereof, it will be understood by those skilled in the art that various changes in form and details may be made therein without departing from the spirit and scope of the invention.

What is claimed is:

1. A process for producing ferromagnetic carbon modified chromium oxide compositions of tetragonal crystal structure containing about 58.5% to 62%, by weight, of chromium, and about 0.05% to 0.90%, by weight, of carbon which comprises:

forming a chromium modified carbon by mixing a modifying chromium salt with carbon in its elemental form, said chromium salt selected from those chromium compounds capable of being absorbed or adsorbed by said carbon, and excluding the oxides and hydroxides of chromium lacking additional elements;

mixing the modified carbon thus formed with chromium trioxide to form a reaction mixture; and then heating the mixture at a temperature within the range of about 450° F. to 850° F. and under a pressure of at least 730 p.s.i.

2. The proces of Claim 1 in which the elemental carbon is selected from the group consisting of acetylene black, bone black, carbon black, charcoal, graphite, lamp black, and carbon oxide.

3. The method of Claim 2 wherein the elemental carbon is in the form of acetylene black.

4. The process of Claim 1 in which the mixture is heated under pressure within the range of about 730 to 44,000 p.s.i.

5. The process of Claim 4 in which the mixture is heated under pressure within the range of about 730 to 14,600 p.s.i.

6. The process of Claim 1 wherein a source of iron is added to the reaction mixture and wherein the resulting carbon modified chromium oxide includes 0.15% to about 1.6%, by weight, of iron.

7. The process of Claim 6 wherein the iron source is elemental iron and wherein the ferromagnetic particles produced exhibit a coercivity in the range of about 350 oersteds to about 600 oersteds.

8. The method of Claim 1 wherein a source of tin is added to the reaction mixture.

9. The method of Claim 8 wherein the source of tin is elemental tin and wherein the magnetic particles formed exhibit a coercivity in the range of about 300 oersteds to about 450 oersteds.

10. The method of Claim 9 wherein the elemental carbon is selected from the group consisting of acetylene black, bone black, carbon black, charcoal, graphite, lamp black and carbon oxide.

11. The method of Claim 10 wherein the elemental carbon is acetylene black.

12. The process of Claim 11 in which the mixture is heated under a pressure within the range of about 730 to 44,000 p.s.i.

13. The process of Claim 12 in which the mixture is heated under a pressure within the range of about 730 to 14,600 p.s.i.

14. The process of Claim 1 in which the modifying chromium salt is selected from the group consisting of chromium halides, nitrates, sulfates and acetates.

15. An acicular carbon and iron modified chromium oxide ferromagnetic composition having tetragonal crystal structure, consisting essentially of 58.5% to 62%, by weight, of chromium, about 0.05% to 0.90%, by weight, of carbon, and about 0.15% to about 1.6%, by weight, of iron, said ferromagnetic composition having an intrinsic coercivity within the range of about 350 to 600 oersteds.

16. A magnetic recording medium which comprises a substrate of nonmagnetic material having bonded thereto a magnetic coating of carbon and iron modified chromium oxide ferromagnetic composition as set forth in Claim 15.

17. An acicular carbon and tin modified chromium oxide ferromagnetic composition having tetragonal crystal structure, consisting essentially of 58.5% to 62%, by weight, of chromium, about 0.05% to 0.90%, by weight, of carbon, and about 0.01% to about 0.35%, by weight, of tin.

18. The carbon and tin modified chromium oxide ferromagnetic composition of Claim 17 in which said ferromagnetic composition has an intrinsic coercivity within the range of about 300 to 450 oersteds.

16. A magnetic recording medium which comprises a substrate of nonmagnetic material having bonded thereto a magnetic coating of carbon and tin modified chromium oxide ferromagnetic composition as set forth in Claim 17.

References Cited

UNITED STATES PATENTS

| | | | |
|---|---|---|---|
| 2,923,684 | 2/1960 | Ingraham | 252—62.51 |
| 3,034,988 | 5/1962 | Ingraham et al. | 252—62.51 |
| 3,600,314 | 8/1971 | Haines | 252—62.51 |
| 3,278,263 | 10/1966 | Cox | 252—62.51 X |
| 3,600,315 | 8/1971 | Haines | 252—62.51 |
| 3,547,823 | 12/1970 | Mihara et al. | 252—62.51 |

JACK COOPER, Primary Examiner

U.S. Cl. X.R.

252—62.51, 62.55, 62.56